(12) United States Patent
Finch et al.

(10) Patent No.: US 9,309,363 B2
(45) Date of Patent: Apr. 12, 2016

(54) PRODUCT AND METHOD FOR MAKING UNIFORM SPHERICAL, ACRYLIC POLYMERIC BEADS

(71) Applicant: ROHM AND HAAS COMPANY, Philadelphia, PA (US)

(72) Inventors: John D. Finch, North Wales, PA (US); Thomas C. Kirk, Ivyland, PA (US)

(73) Assignee: Rohm and Haas Company, Philadelphia, PA (US)

( * ) Notice: Subject to any disclaimer, the term of this patent is extended or adjusted under 35 U.S.C. 154(b) by 21 days.

(21) Appl. No.: 14/389,610

(22) PCT Filed: Mar. 27, 2013

(86) PCT No.: PCT/US2013/033969
§ 371 (c)(1),
(2) Date: Sep. 30, 2014

(87) PCT Pub. No.: WO2013/148746
PCT Pub. Date: Oct. 3, 2013

(65) Prior Publication Data
US 2015/0064468 A1    Mar. 5, 2015

Related U.S. Application Data

(60) Provisional application No. 61/618,170, filed on Mar. 30, 2012.

(51) Int. Cl.
| | | |
|---|---|---|
| *C08J 5/20* | (2006.01) | |
| *B01J 19/10* | (2006.01) | |
| *C08F 2/01* | (2006.01) | |
| *C08F 120/14* | (2006.01) | |
| *B01J 39/18* | (2006.01) | |
| *B01J 41/12* | (2006.01) | |
| *C08F 2/18* | (2006.01) | |

(52) U.S. Cl.
CPC .. *C08J 5/20* (2013.01); *B01J 19/10* (2013.01); *B01J 39/185* (2013.01); *B01J 41/125* (2013.01); *C08F 2/01* (2013.01); *C08F 120/14* (2013.01); *C08F 2/18* (2013.01); *C08J 2333/08* (2013.01); *Y10T 428/2982* (2015.01)

(58) Field of Classification Search
CPC ............... B01J 19/10; B01J 2/06; B01J 2/18; B01J 39/185; B01J 41/125; C08F 20/10; C08F 2/01; C08F 120/14
USPC .............................................. 428/402; 264/9
See application file for complete search history.

(56) References Cited

U.S. PATENT DOCUMENTS

| | | |
|---|---|---|
| 4,427,794 A | 1/1984 | Lange |
| 4,444,961 A | 4/1984 | Timm |
| 4,623,706 A | 11/1986 | Timm et al. |
| 7,947,748 B2 | 5/2011 | Finch et al. |
| 2003/0114544 A1 | 6/2003 | Klipper et al. |
| 2008/0234398 A1 | 9/2008 | Klipper et al. |
| 2010/0252506 A1 | 10/2010 | Klipper et al. |

FOREIGN PATENT DOCUMENTS

| | | | |
|---|---|---|---|
| DE | 102007034732 A1 | | 1/2009 |
| EP | 0046535 | * | 3/1982 |
| EP | 046535 A2 | | 3/1982 |
| EP | 0051210 | * | 5/1982 |
| EP | 0051210 A2 | | 5/1982 |
| EP | 0173518 | * | 3/1986 |
| EP | 0173518 A2 | | 3/1986 |
| EP | 1323473 | * | 7/2003 |
| EP | 1323473 A2 | | 7/2003 |
| EP | 1964608 | * | 9/2008 |
| EP | 1964608 A1 | | 9/2008 |

* cited by examiner

*Primary Examiner* — Leszek Kiliman
(74) *Attorney, Agent, or Firm* — Carl P. Hemenway; Tifani M. Edwards

(57) ABSTRACT

The present invention provides a method for making uniform, spherical, acrylic polymeric beads by jetting, the beads produced, and ion exchange resins produced from functionalizing the uniform, spherical polymeric beads.

8 Claims, No Drawings

PRODUCT AND METHOD FOR MAKING UNIFORM SPHERICAL, ACRYLIC POLYMERIC BEADS

Ion exchange resins are widely used for softening and purifying water, desalination of aqueous solutions, concentration and isolation of small molecules such as sugars and pharmaceutical compounds, purification of consumable liquids, as well as for chemical processing including catalysis. Uniform, spherical polymeric beads have become increasingly useful for these types of applications.

The present invention provides a method for making uniform, spherical, acrylic polymeric beads by jetting, the beads produced and ion exchange resins produced from functionalizing the uniform, spherical polymeric beads.

Uniform sized spherical ion exchange resins can be produced in several ways, most typically by performing chemical reactions on uniformly sized solid polymeric spherical precursors commonly referred to as copolymer beads, or by mechanically selecting the desired size of either the resins or the precursor beads from a mixture of sizes.

Production of uniformly sized copolymer beads can be directly accomplished by expanding a small "seed" particle to a larger size, or by "jetting" a stream of droplets and in both cases the preparation is finished by polymerization.

In the case of production of uniformly sized copolymer beads by "jetting", traditional copolymer beads were typically formed from hydrophobic monomers, for example vinyl aromatic monomers such as styrene. Previously, jetting hydrophilic monomers such as acrylates was considered very difficult because of the high water solubility of the monomers in the monomer phase, causing mass transfer of monomer through the interface into the continuous phase. This mass transfer of monomer can disrupt the interface causing broad particle size distributions. In the present application the interface is the layer between the monomer phase and the continuous phase.

One reference, U.S. Pat. No. 7,947,748 B2 discloses improvements to processes for jetting uniform polymerizable droplets and polymer beads. These improvements include downward flow of the unpolymerized droplet suspension through a transfer line to the polymerization reactor. Additionally, the disclosure in U.S. Pat. No. 7,947,748 B2 includes the possibility of jetting of acrylic monomers combined with the addition of a salt such as NaCl or $Na_2SO_4$ to reduce the solubility of the acrylic monomers, or other monomers with appreciable water solubility, in the aqueous phase. Although U.S. Pat. No. 7,947,748 discloses the possibility of jetting acrylic monomers, the reference requires the addition of salt in such cases. Disadvantageously, the added salts produce negative effects on the aqueous phase. Such effects include, for example, rendering the suspending agents required for successful suspension polymerization ineffective.

It has now been discovered that jetting of hydrophilic monomers to form uniform hydrophilic copolymeric beads can be accomplished. The uniform copolymeric beads produced by the method of the present invention demonstrate improved yield in the required size distribution, improved separability, sharper chromatographic separations, lower pressure drop, particularly in viscous applications, and more efficient use of regenerant in ion exchange applications.

The present invention solves the problems in the art by providing a method for preparing uniform, spherical polymeric beads comprising:

i) providing a monomer phase wherein the monomer phase comprises a hydrophilic, polymerizable monomer;

ii) providing a continuous phase wherein the continuous phase comprises an aqueous phase and further comprises a water soluble acrylic monomer;

iii) feeding the monomer phase into a first portion of the column at a rate such that the monomer phase is forced through the first portion of the column into a second potion of the column comprising the continuous phase to form a jet;

iv) vibratorily exciting the jet at a frequency which breaks the jet into droplets; and v) polymerizing the droplets in suspension to form uniform, spherical polymeric beads.

Additionally, the present invention provides, the uniform, spherical polymeric bead formed by the above-referenced method. Also, the present invention provides an ion exchange resin formed by the functionalizing the uniform, spherical polymeric beads.

As used herein, by "uniform" is meant that the uniform, spherical polymeric beads exhibit a particle size distribution having a coefficient of variance of less than 0.1. Additionally, one measure of particle size uniformity is the uniformity coefficient (UC), which is calculated as: $UC=d_{60}/d_{10}$ where $d_{60}$ is the particle diameter at which 60% of the particles by volume have a smaller diameter, and $d_{10}$ is the particle diameter at which 10% of the particles by volume have a smaller diameter. Preferably, UC is no more than 1.3, alternatively no more than 1.25, alternatively no more than 1.2, alternatively no more than 1.15, alternatively no more than 1.10.

As used herein by "hydrophilic" is meant having a thermodynamically favorable tendency to interact with polar solvents, and with water in particular.

As used herein by "water soluble" is meant a solubility greater than or equal to 2 wt % as determined by the mass concentration at saturation measured at 20° C.

The term "acrylic polymer" indicates a copolymer formed from a mixture of vinyl monomers containing at least one (meth)acrylic acid or ester, or (meth)acrylonitrile, along with at least one crosslinker, wherein the combined weight of the (meth)acrylic acid(s) or ester(s) or (meth)acrylonitrile and the crosslinker(s) is at least 50 weight percent of the total monomer weight; preferably at least 75%, more preferably at least 90%, and most preferably from a mixture of monomers that consists essentially of at least one (meth)acrylic acid or ester and at least one crosslinker. In some embodiments, a (meth) acrylic acid ester is a $C_1$-$C_4$ alkyl ester. As used herein the term "(meth)acrylic" refers to acrylic or methacrylic and "acrylate" refers to acrylate and (meth)acrylate.

The term "gel" resin applies to a resin which was synthesized from a very low porosity (0 to 0.1 $cm^3$/g), small average pore size (0 to 17 Å) and low B.E.T. surface area (0 to 10 $m^2$/g) copolymer.

The term "macroreticular" (or MR) resin is applied to a resin which is synthesized from a high mesoporous copolymer with higher surface area than the gel resins. The total porosity of the MR resins is between 0.1 and 0.7 $cm^3$/g, average pore size between 17 and 500 Å and B.E.T. surface area between 10 and 200 $m^2$/g. MR resins typically are made by incorporating an organic solvent ("porogen") into the monomer mixture.

The term "adsorbent resin" is applied to a bead which can be functionalized or not, and which has very high surface area and porosity. These adsorbents have surface area between 200 and 1300 $m^2$/g, average pore size between 17 and 1000 Å. and total porosity between 0.7 and 200 $cm^3$/g.

As used herein, the singular forms "a," "an," and "the" include plural referents unless the context clearly dictates otherwise.

As used herein, the terms "preferably," "more preferably," and "most preferably" are not intended to suggest a mode that is deemed to be superior but instead is meant to embody suitable narrower ranges of a broader range or group.

Percentages are weight percentages, unless specified otherwise.

According to the present invention uniform, spherical polymeric resins may be made by conventional jetting processes known by those of ordinary skill in the art. Examples of such jetting processes are disclosed in U.S. Pat. No. 4,623,706, U.S. Pat. No. 4,444,961, and U.S. Pat. No. 7,947,748 B2. Instead of using a hydrophobic, polymerizable monomer in the monomer phase as is employed in the processes of the prior art, here a hydrophilic, polymerizable monomer in the monomer phase is employed in the process of the present invention. In the present invention, hydrophilic, polymerizable monomers are jetted into a continuous phase. Suitable hydrophilic, polymerizable, monomers are water soluble. Examples of suitable hydrophilic, polymerizable monomers include, but are not limited to, those listed in Table 1.

TABLE 1

| Abbreviation | Monomer Compound | Solubility (g/l00 g) at 20° C. |
| --- | --- | --- |
| HPMA | Hydroxypropyl methacrylate | 10.70 |
| GMA | Glycidyl methacrylate | 2.30 |
| MA | Methyl acrylate | 6.00 |
| EA | Ethyl acrylate | 2.00 |
| AN | Acrylonitrile | 7.00 |
| VA | Vinyl acetate | 2.00 |

In operation, the monomer phase comprising a hydrophilic, polymerizable monomer, including mixtures of one or more hydrophilic copolymerizable monomers and mixtures of one or more hydrophilic copolymerizable monomers with a non-polymerizable material, e.g., inert porogenic or pore-forming material or prepolymer, is introduced into a first portion of a column. Preferably, the hydrophilic, polymerizable monomer useful in the present invention has a density less than the density of the continuous phase at constant temperature. Preferably, the hydrophilc, polymerizable monomer is acrylonitrile or methyl acrylate or mixtures thereof. More preferred is methyl acrylate.

In general, the monomer phase includes a polymerization initiator suitable for initiating the polymerization of the monomer. Suitable polymerization initiators in the monomer phase include but are not limited to, e.g., benzoyl peroxide, tert-butyl hydroperoxide, cumene peroxide, tetralin peroxide, acetyl peroxide, caproyl peroxide, tert-butyl perbenzoate, tert-butyl diperphthalate, and methyl ethyl ketone peroxide. Azo initiators are also useful. Useful azo initiators include, e.g., 2,2'-azobisisobutyronitrile and 2,2'-azobis(2,4-dimethylpentanenitrile), which is commercially available under the trade name VAZO 52 from DuPont. A typical effective amount of organic initiator relative to dry monomer was found to be about 0.5 to about 2% by weight, preferably about 0.8 to about 1.5% by weight.

The monomer phase is fed into a first portion of a column wherein the column preferably comprises an orifice plate having one more holes called passages. This orifice plate separates the first portion of the column from a second portion of the column Typically, the monomer phase is fed at a rate such that the monomer phase is forced through the first portion of the column or preferably through the passages of the orifice plate into the second portion of the column wherein the continuous phase resides and therein forms a jet having laminar flow characteristics. In this invention, a laminar flow jet has a flow rate defined by the dimensionless Reynolds number (Re) from 20 to 2,000, preferably 100 to 700, wherein Reynolds number is defined as the product of the density of the monomer phase (p), including the polymerization initiator and other additional materials, expressed in grams per cubic centimeter (g/cm$^3$), the mean jet velocity (v) of the monomer phase expressed in centimeters per second (cm/sec) and the diameter (d), expressed in centimeters (cm) of the opening through which the monomer is flowed divided by the viscosity (m) of the monomer phase expressed in poise (i.e., Re=pvd/m).

As the thus-formed monomer jet flows into the second portion of the column comprising the continuous phase, the jet is vibratorily excited at a frequency which breaks the jet into droplets. This excitation may be made by any means known to those of ordinary skill in the art, such as for example by the means disclosed in U.S. Pat. No. 4,444,961 and U.S. Pat. No. 7,947,748 B2. In general, the monomer jet is excited at conditions such that uniform sized droplets are prepared. In the practice of this invention, droplets having such distribution are prepared by vibratorily exciting the monomer jet at constant vibrational characteristics defined by the dimensionless Strouhal number (St) from 0.05 to 5, preferably 0.2 to 1.2, wherein the Strouhal number is the product of $2\pi$, the frequency (0 of the vibration expressed in hertz (hz) and the diameter (d), expressed in cm, of the opening through which the monomer is flowed divided by the mean jet velocity (v) of the monomer phase expressed in cm/sec (i.e., St=$2\pi$fd/v).

The continuous phase is an aqueous phase. This aqueous phase comprises water and a water soluble acrylic monomer. Preferably the water soluble acrylic monomer a monoethylenically unsaturated monomer with a water solubility greater than 2 wt % when measured at 25° C., further preferably the water soluble acrylic monomer is a monoethylenically unsaturated acrylic ester with a water solubility greater than 2 wt % when measured at 25° C. Most preferably the water soluble acrylic monomer of the continuous phase is the same as the hydrophilic, polymerizable monomer of the monomer phase. The water soluble acrylic monomer is present in the continuous phase in an amount defined as the ratio of the monomer concentration compared to the monomer concentration in the fully saturated aqueous phase, preferably at a ratio of 0.05 to 1.0, more preferably at a ratio of 0.2 to 1.0, and most preferably at a ratio of 0.5 to 1.0, where a ratio of 1.0 indicates that the aqueous phase is fully saturated with the water soluble monomer.

Preferably, the continuous phase may further comprise a colloidal stabilizer and/or a viscosity modifier or mixtures thereof. Examples of colloidal stabilizers known to those skilled in the art are proteins such as gelatin, soy protein, hydrolyzed soy protein, wheat protein, spirulina, and rice protein; polysaccharides such as hydroxyethylcellulose, methylhydroxyethylcellulose, hydroxypropylmethylcellulose, carboxymethylcellulose, pectin, xanthan gum, gellan gum, sodium lignosulfonate, agar, carrageenan, sodium alginate, starch, gum arabic, and gum tragacanth.

Examples of viscosity modifiers are polyvinylalcohol, polyvinylpyrrolidone, polyvinylcaprolactam, polyacrylic acid, polydimethyldiallyl ammonium chloride, hydrolyzed poly(styrene-co-maleic anhydride), and hydrolyzed poly(methylvinylether-co-maleic anhydride). Other additives such as surfactants, buffers, and aqueous inhibitors can also be added.

Preferably, the colloidal stabilizer in the aqueous phase is a naturally occurring or synthetic water-soluble polymer which forms a layer of colloidal stabilizer around the monomer droplets having an interfacial tension of at least 3 dynes/cm$^2$, alternatively at least 8 dynes/cm$^2$, and without phase changes or formation of covalent bonds. In contrast, encapsulation processes involve phase changes such as gelation caused by lowering temperature or by addition of polyvalent ions or electrolytes; or covalent bond formation, e.g., from reaction with formaldehyde. Encapsulated drops typically are stable over long periods of time, while the drops in the present invention can be unstable. Especially preferred colloidal stabilizers include, e.g., polyacrylic acid with Type A gelatin, polydimethyldiallylammonium chloride with Type A gelatin, carboxymethyl cellulose, carboxymethylcellulose with hydroxypolyethylene alkylphenol and polyether phosphate ester, hydroxypropyl methylcellulose, hydroxypropyl methylcellulose with hydroxypolyethylene alkylphenol and polyether phosphate ester, methylhydroxyethylcellulose. Preferably, the total amount of colloidal stabilizers in the aqueous phase is from 0.05% to 1%, alternatively from 0.05% to 0.5%. The colloidal stabilizer, viscosity modifier, and other optional components may be added individually or as mixtures. They may be added to the column and mixed with the continuous phase or may be added at another point in the process prior to polymerization of the uniform, hydrophilic copolymer droplets. The monomer and continuous phases are maintained at temperatures from ambient temperatures (e.g., from 18° C. to 25° C.) to 70° C. To prevent substantial polymerization and to most effectively employ the suspending agent, temperatures from ambient temperature to 50° C., preferably 20° C. to 50° C. are maintained. The polymerization of the monomer is subsequently conducted employing conventional techniques. These generally comprise batchwise polymerization techniques consisting of heating the monomer under free radical forming conditions, with the suspending liquid serving as the polymerization medium. Additional amounts of the same or a different suspending agent are advantageously added to a polymerization reactor to help maintain the uniform particle size of the droplets during polymerization. Upon completion of polymerization, the uniformly sized polymer beads are withdrawn from the polymerization vessel for subsequent recovery using conventional dewatering techniques such as filtration, centrifugation, or decantation.

Typically in the present invention, the apparatus for preparing uniform, spherical polymeric beads, may be characterized by (1) a column containing the monomer phase in a first portion of the column wherein the monomer phase comprises a hydrophilic, polymerizable monomer, (2) a second portion of the column containing a continuous phase of a water soluble acrylic monomer, a colloidal stabilizer, and/or a viscosity modifier, (3) a jet forming means in intimate contact with the monomer phase and the continuous liquid phase such that the monomer phase is capable of flowing as a jet having laminar flow characteristics through into the continuous phase, (4) a vibratory exciter capable of exciting the monomer jet such that the jet is broken into droplets, and (5) a means for polymerizing the droplets in suspension at conditions such that significant coalescence or additional dispersion of the droplets does not occur.

The suspension polymerization product in the form of uniform, spherical polymeric beads have a harmonic mean particle size prior to the mechanical separation thereof of 50 to 2000 µm and preferably 200 to 1000 µm. Additionally, the uniformity coefficient is no more than 1.3, preferably no more than 1.2, and more preferably no more than 1.15.

In some embodiments of the invention, the polymerization product in the form of uniform, spherical polymeric beads may by functionalized as ion exchange resins by known methods. For example, acrylic cation exchange resins may be obtained by hydrolysis of the uniform, spherical polymeric beads or by other known methods of the art. Acrylic anion exchange resins may be obtained by amidation of the uniform, spherical polymeric beads or by other known methods of the art.

EXAMPLE 1

Uniform, spherical polymeric beads were produced by charging an aqueous heel containing 239.4 grams of an aqueous solution containing 0.225 wt % of a 50% NaOH solution, 0.174 wt % boric acid, 0.226 wt % gelatin (Type A from pigskin, Pharmagel A), and 2.028 wt % of a 20% solution of poly(diallyldimethyl ammonium chloride) (Catfloc C) in deionized water to a 2-liter laboratory reactor equipped with a pitched blade turbine agitator, temperature probe, a port for the addition of cooling (quench) water directly to the reaction mixture, and an external heat source.

A jetting continuous phase was prepared containing 0.106 wt % of a 50% sodium hydroxide solution, 0.089 wt % boric acid, and 0.103 wt % gelatin (Type A from pigskin, Pharmagel A) in deionized water.

A droplet formation column and transfer line were filled with the jetting continuous phase.

A portion of the jetting continuous phase was stirred gently at ambient temperature and methyl acrylate was added slowly to the stirred solution until no more methyl acrylate would dissolve. The persistence of a small amount of undissolved methyl acrylate on the surface of the aqueous solution indicated that the solution was fully saturated (about 5 weight percent methyl acrylate was required). The solution thus prepared is referred to as the "Fully Saturated Jetting Continuous Phase".

The droplet generation apparatus contained 2 holes both of 170 microns in diameter which were vibrationally excited at a frequency of 545 Hertz. The droplet generator consisted of a bowl on which a removable 2-hole orifice plate was sealed using o-rings. The bowl and orifice plate were located at the bottom of the formation column, submerged in the jetting continuous phase, and sealed to the column with o-rings. The bowl and orifice plate were attached to a push rod which was attached to a modal exciter. The modal exciter was driven by an external frequency generator and amplifier and vibrated the bowl and orifice plate axially within the formation column at the required amplitude and frequency.

A monomer phase consisting of 90.5 wt % methyl acrylate, 5.48 wt % of a 63 wt % commercial divinybenzene solution, 2.67 wt % of deionized water, 0.868 wt % lauryl peroxide, 0.476 wt % of diethylene glycol divinyl ether, and 0.0050 wt % benzoquinone was fed at a constant feed rate of 3.26 milliliters per minute to the bowl of the droplet generation device. A separate supply of the Fully Saturated Jetting Continuous Phase was fed to the bottom of the formation column at a rate of 2.46 milliliters per minute.

The droplet dispersion formed in the formation column flowed through the transfer line to the reactor. A second aqueous phase consisting of 0.626 wt % of a 50% NaOH solution, 0.481 wt % boric acid, 0.626 wt % gelatin (Type A from pigskin, Pharmagel A), and 8.59 wt % of a 20% solution of poly(diallyldimethyl ammonium chloride) (Catfloc C) was fed directly to the reactor at a rate of 0.76 milliliters per minute starting at the same time as the dispersed droplet feed to ensure the stability of the dispersion. During the entire feed the reaction mixture (heel+droplet dispersion+stabilizer aqueous) was agitated sufficiently to fully suspend the droplets without either coalescence or shear induced resizing of the droplets.

The reactor fill was conducted at ambient temperature and pressure in the presence of air for a period of 108 minutes.

The reaction mixture was then heated externally from ambient temperature to 59° C. over a period of one hour. The reaction mixture was held at 59° C. for approximately 60 minutes at which time a self heating (exothermic) reaction began and caused the temperature to rise to a maximum of 79° C. over a period of about 5 minutes. External heating was discontinued. During this time cold water, (quench), was slowly added to the reacting droplet dispersion to control the temperature of the reaction mixture at 79° C. or below. The quench water addition was stopped and when the temperature had dropped to 72° C. the impeller speed was increased to ensure that the polymer beads remained fully suspended. The reaction mixture remained above 59° C. and below 72° C. without applied heating or cooling. After a total time of 105 minutes from the time that the reaction mixture first reached 59° C. the mixture was then heated to 92° C. over a period of 20 minutes and maintained at 92° C. for 90 minutes, at which point it was allowed to cool to ambient temperature.

A single portion of 8.0 grams of 50% Sodium Hydroxide solution was added to the rapidly agitated bead mixture at 22° C. and mixed for one hour to hydrolyze any free methyl acrylate monomer present. The reaction liquor was then withdrawn from the reactor with a dipstick filter, and 500 milliliters of tap water was then added and agitated for 5 minutes. The liquid was then removed with the dipstick filter, and the washing procedure was repeated an additional two times. The total quantity of wash water added was 1500 milliliters. The beads were removed from the reactor and air dried in a 60° C. oven for 8 hours.

COMPARATIVE EXAMPLE 1

The procedure of Example 1 was repeated using the same equipment and reagents, with the exception that the Fully Saturated Jetting Continuous Phase was not prepared and was not used. The untreated jetting continuous phase was used instead and the continuous phase contained no methyl acrylate.

In contrast to Example 1 some coalescence of the droplets was observed in the formation column and transfer line.

The temperature rise indicating rapid exothermic reaction occurred at about 90 minutes after reaching the hold temperature of 59° C., significantly later than was observed in Example 1.

The particle size distribution of the beads was determined using a Beckman Coulter Rapidvue® Particle Size Analyzer and the results are shown below in Table 2.

TABLE 2

| Particle Size Analysis Results | | |
| --- | --- | --- |
| Experiment | Harmonic Mean Size (HMS) in Microns | Uniformity Coefficient (UC) |
| Example 1 (invention) | 477 | 1.11 |
| Example 2 (comparative) | 475 | 1.34 |

Droplet Generation Electronic Equipment:
Frequency Generator Bruel and Kjaer Model 1050 Frequency Generator
Amplifier: Bruel and Kjaer Model 2706 Power
Modal Exciter: Bruel and Kjaer Model 4809 Vibration

What is claimed is:

1. A method for preparing uniform, spherical polymeric beads comprising
   i) providing a monomer phase wherein the monomer phase comprises a hydrophilic, polymerizable monomer; wherein the hydrophilic, polymerizable monomer is water soluble;
   ii) providing a continuous phase wherein the continuous phase is an aqueous phase and further comprises a water soluble acrylic monomer; wherein the ratio of the concentration of the water soluble acrylic monomer in the aqueous phase to the concentration of the water soluble acrylic monomer that would be present in the aqueous phase if the aqueous phase were saturated with the water soluble acrylic monomer is 0.5 to 1.0;
   ii) feeding the monomer phase into a first portion of a column at a rate such that the monomer phase is forced through the first portion of the column into a second portion of the column comprising the continuous phase to form a jet;
   iv) vibratorily exciting the jet at a frequency which breaks the jet into droplets; and
   v) polymerizing the droplets in suspension to form uniform, spherical polymeric beads.

2. The method of claim 1 further wherein the water soluble acrylic monomer is a monoethylenically unsaturated monomer with a water solubility greater than 2 wt % measured at 25° C.

3. The method of claim 1 wherein the water soluble acrylic monomer is a monoethylenically unsaturated acrylic ester with a water solubility greater than 2 wt % measured at 25° C.

4. The method of claim 1 wherein the formed uniform, spherical polymeric beads have a uniformity coefficient of no more than 1.3.

5. The method of claim 1 further comprising functionalizing the uniform, spherical polymeric beads to form an ion exchange resin.

6. The uniform, spherical polymeric beads formed by the method of claim 1.

7. The ion exchange resin formed by functionalizing the uniform, spherical polymeric beads of claim 6.

8. The method of claim 1, wherein the hydrophilic, polymerizable monomer is the same as the water soluble acrylic monomer.

* * * * *